United States Patent [19]

Kegeler et al.

[11] Patent Number: 4,606,831

[45] Date of Patent: Aug. 19, 1986

[54] STABILIZED GALACTOMANNAN GUM COMPOSITIONS

[75] Inventors: Gary H. Kegeler, Rancho Cucamonga; Howard L. Vandersall, Upland, both of Calif.

[73] Assignee: Monsanto Company, St. Louis, Mo.

[21] Appl. No.: 745,742

[22] Filed: Jun. 17, 1985

[51] Int. Cl.$^4$ .......................... A62C 1/00; A62D 1/00
[52] U.S. Cl. ...................................... 252/7; 252/8.05; 252/601; 252/315.3; 536/114; 106/205; 106/208; 548/142
[58] Field of Search ...................... 252/315.3, 7, 8.05, 252/610, 611, 601; 536/114; 106/205, 208; 548/142

[56] References Cited

U.S. PATENT DOCUMENTS

| | | | |
|---|---|---|---|
| 3,146,200 | 8/1964 | Goldstein et al. | 252/8.5 |
| 3,301,723 | 1/1967 | Chrisp | 149/20 |
| 3,634,234 | 1/1972 | Morgenthaler | 252/7 |
| 3,791,838 | 2/1974 | Kaplan | 106/205 |
| 3,914,241 | 10/1975 | Elliott et al. | 548/142 |
| 4,060,132 | 11/1977 | Chiesa, Jr. | 252/8.05 |
| 4,060,489 | 11/1977 | Chiesa, Jr. | 252/8.05 |
| 4,112,223 | 9/1978 | Lin et al. | 536/114 |
| 4,225,592 | 9/1980 | Lakatos et al. | 536/121 |
| 4,447,336 | 12/1981 | Vandersall | 252/7 |
| 4,447,337 | 5/1984 | Adl et al. | 252/7 |

FOREIGN PATENT DOCUMENTS

| | | | |
|---|---|---|---|
| 2724162 | 8/1977 | Fed. Rep. of Germany | 252/603 |
| 2921306 | 11/1979 | Fed. Rep. of Germany | 252/603 |

*Primary Examiner*—John F. Terapane
*Assistant Examiner*—S. Wolffe
*Attorney, Agent, or Firm*—Thomas E. Kelley; Arthur E. Hoffman

[57] ABSTRACT

Galactomannan gum-thickened aqueous compositions are stabilized with a dimercaptothiadiazole.

25 Claims, No Drawings

STABILIZED GALACTOMANNAN GUM COMPOSITIONS

This application relates to galactomannan gum-thickened compositions and, particularly, to stabilization of such compositions against viscosity loss during storage.

BACKGROUND OF THE INVENTION

Galactomannan gum thickeners are used to increase the viscosity of aqueous solutions or slurries such as oil well drilling fluids and fire retardant compositions and for modification and/or control of other rheological properties such as surface tension. When galactomannan gum-thickened aqueous compositions are stored for long periods of time, viscosity losses sometimes occur; and the losses are greater when such solutions are in contact with metals, apparently due to the destabilizing effect of ferrous ion. In order to extend the storage stability of galactomannan gum-thickened compositions, the use of certain salts and of heavy metal ions have been proposed. See U.S. Pat. Nos. 3,146,200 and 3,634,234. More recently, a soluble molybdenum compound and a mixture of molybdenum and a thiourea compound have been found to be useful as viscosity stabilizers. See U.S. Pat. Nos. 4,447,336 and 4,447,337.

Because of the fact that prior art viscosity stabilizers for galactomannan gum-thickened systems, have been known to exhibit characteristics which are incompatible with other additives or components and/or with the desired end uses, the discovery of additional stabilizers to provide broader utility would constitute a significant advance in the art and is an object of this invention.

SUMMARY OF THE INVENTION

It has now been discovered that fire retardant galactomannan gum-thickened aqueous compositions are obtained by incorporation of a stabilizing amount of a dimercaptothiadiazole. Viscosity stabilized compositions are obtained by incorporation into a galactomannan gum-thickened aqueous composition a dimercaptothiadiazole of the formula:

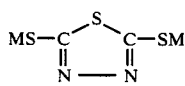

in which each M independently is hydrogen or a metal, such as an alkali metal. The dimercaptothiadiazole can advantageously be used in combination with a soluble molybdenum compound.

This invention also provides for an aqueous fire retardant composition, and an aqueous or dry concentrate for preparing the aqueous fire retardant composition.

DESCRIPTION OF THE INVENTION

Any amount of stabilizer system sufficient to reduce viscosity loss of the composition during storage is suitable for the practice of this invention. Generally, a viscosity stabilizing amount comprises from 0.01 to 1 part by weight of dimercaptothiadiazole per 100 parts by weight of water. If the dimercaptothiadiazole is used in conjunction with a soluble molybdenum compound, it is preferred that the composition contain from 0.00001 to 1 part by weight of molybdenum per 100 parts of water, or, expressed in parts per million (ppm), the amount of molybdenum is preferred to be about 0.1–10,000 ppm. More preferably, the amount of molybdenum is about 1–500 ppm, and even more preferably is about 1–250 ppm. A sufficient quantity of soluble molybdenum compound is provided to give the indicated amounts of molybdenum containing ion.

One embodiment of the invention comprises aqueous fire retardant compositions comprising a fire retardant salt selected from the group consisting of an ammonium phosphate, an ammonium sulfate, phosphate polymers and mixtures thereof, a viscosity increasing amount of galactomannan gum thickener; and a sufficient amount of a dimercaptothiadiazole to reduce viscosity loss during storage of the composition. The composition may also contain a water soluble molybdenum compound. A typical composition comprises 1–30 parts by weight of fire retardant salt, 0.01 to 10 parts by weight of galactomannan gum thickener, 0.00001 to 1 part by weight of soluble molybdenum, and 0.01 to 1 part by weight of a dimercaptothiadiazole, and 100 parts by weight of water.

All of the components of a fire retardant composition except water may be blended to form a liquid or dry concentrate, preferably dry and in powder form. The concentrate is then mixed with water and stored until needed. A typical concentrate comprises a fire retardant salt, galactomannan gum thickener, and a viscosity stabilizing amount of a dimercaptothiadiazole and, optionally, a water soluble molybdenum compound. Preferably, a dry powder concentrate composition of the invention comprises about 75 to 98 percent by weight of fire retardant salt, about 1 to 25 percent by weight of galactomman gum thickener, about 0.01 to 2 percent by weight of a dimercaptothiadiazole, and about 0.0001 to 1 percent by weight of a water soluble molybdenum compound. This dry concentrate is then mixed with water, preferably from about 0.5 to about 2.5 pounds of dry concentrate per gallon of water (from about 0.05 kg to about 0.25 kg of dry concentrate per liter of water). A particularly preferred concentrated fire retardant composition comprises about 75 to 98 percent by weight of ammonium sulfate or a mixture of ammonium sulfate and any of the various ammonium phosphate fire retardant salts and about 2 to 25 percent by weight of guar gum or ether derivatives of guar gum. The stabilizer can either be added directly to the aqueous or dry concentrate or can be added to the fire retardant solution, either during or after dissolution.

Other components and stabilizers, typically included in fire retardant compositions, may also be present, including but not limited to, corrosion inhibitors, bactericides, defoamers, colorants and flow conditioners or other fire retardants. These other components and stabilizers are typically present up to a total of about 15 parts per 100 parts of water.

One advantage of the stabilizer of this invention is that it is effective in the presence of materials which accelerate viscosity loss of galactomannan gum-thickened aqueous compositions. For example, iron and other transition metals exert a deleterious effect upon the storage stability of galactomannan gum-thickened aqueous compositions. Regardless of the reason for the aforesaid deleterious effect, the stabilizer system of the invention inhibits the destabilization effect of these metals.

The term galactomannan gum thickener as used herein refers to galactomannan gum and derivatives thereof which, when added to water, increase the viscosity of the resulting aqueous composition. Galactomannan gums are materials derived from a variety of leguminous plants such as locust beans and guar gum seeds. Galactomannan is a high molecular weight polysaccharide made up of many mannose and galactose units. The galactomannan gum molecule is essentially a straight chain mannan branched at regular intervals with galactose or mannose units. Derivatives of galactomannan gums are also valuable thickeners. Galactomannan gums may be substituted by addition of hydroxy alkyl or carboxy alkyl groups to the hydroxyl radical. These resulting derivatives impart improved properties to the galactomannan gum. See U.S. Pat. No. 4,272,414 which is incorporated herein by reference. The degree of etherification may vary from 0.01 to 0.9 moles. Normally the degree of substitution is from 0.05 to 0.5. A preferred galactomannan gum thickener is guar gum and its derivatives. Typically, a viscosity increasing amount of galactomannan gum is about 0.01 to 10 parts by weight per 100 parts by weight of water. Preferably, about 0.1 to 5 parts by weight of galactomannan gum are used per 100 parts by weight of water.

Any ammonium phosphate or ammonium sulfate fire retardant is suitable for the stabilized galactomannan gum-thickened compositions of the invention. Examples of ammonium phosphates are monoammonium orthophosphate; diammonium orthophosphates; monoammonium pyrophosphate; diammonium pyrophosphate; triammonium pyrophosphate; tetraammonium pyrophosphate; ammonium polyphosphates; ammonium-alkali metal mixed salts of ortho-, pyro-, and polyphosphates; ammonium-alkaline earth metal mixed salts of ortho-, pyro-, and polyphosphates; and mixtures thereof. Examples of ammonium sulfates include monoammonium sulfate and diammonium sulfate. Preferred fire retardant salts are monoammonium orthophosphate, diammonium orthophosphate, and diammonium sulfate, and particularly preferred is a mixture of monoammonium orthophosphate and diammonium sulfate.

Examples of suitable dimercaptothiadiazoles include, 2,5-dimercapto-1,3,4-thiadiazole, and water soluble metal salts, such as the disodium salt, although other water soluble metal salts may also be utilized.

Any form of water-soluble molybdenum is suitable as a stabilizer along with the dimercaptothiadiazole of this invention. A preferred form of soluble molybdenum is a molybdate, for example, ammonium molybdate and alkali metal molybdate. Examples of satisfactory soluble molybdenum compounds are sodium molybdate, potassium molybdate, lithium molybdate, ammonium molybdate, molybdic acid, molybdic silicic acid, potassium molybdenum cyanate, molybdenum hydroxide, molybdenum oxychloride acid, molybdenum oxydichloride, molybdenum trisulfide, and complex forms of molybdate ion such as sodium-, ammonium-, and potassium- dimolybdates, trimolybdates, tetramolybdates, paramolybdates, tetramolybdates, octamolybdates, decamolybdates, and permolybdates.

A particularly preferred dry concentrate of this invention has the following formulation:

| | |
|---|---|
| Diammonium Sulfate | 50%–86% |
| Monoammonium Orthophosphate | 10%–40% |
| Ether Derivitized Glactomannon Gum Thickener | 2.5%–10% |
| Water-Soluble Molybdenum Compound | 0.0001–1% |
| Dimercaptothiadiazole | 0.01–5.0% |
| Other Components and Stabilizers | 1%–7.5% |

This dry concentrate is dissolved in water from about 0.5 pounds to about 2.5 pounds of concentrate per gallon of water (about 0.05 kg to about 0.25 kg per liter of water).

EXAMPLES

A dry fire retardant concentrate was prepared according to the following formulation:

| | |
|---|---|
| Diammonium Sulfate | 66% |
| Monoammonium Orthophosphate | 22% |
| Hydroxypropyl Guar Gum | 6.4% |
| Sodium Molybdate Dihydrate | 0.2% |
| Other Components and Stabilizers | 5.5% |

The "other components and stabilizers" included corrosion inhibitors, bactericides, colorants, defoamers, and flow conditioners.

A sample was formulated with 1.5% dimercaptothiadiazole (DMTD) and a control was formulated with no DMTD. Both the sample and the control were mixed with water at a rate of 1.2 pounds per gallon of water (0.12 kg per liter of water). Viscosity after 24 hours was determined, using a Brookfield Viscometer and a No. 4 spindle, at room temperature. The control had a viscosity of 1576 cps (1.586 N·s/m$^2$) and the sample had a viscosity of 1619 cps (1.619 N·s/m$^2$). These values were used as the initial viscosity. Portions of the sample and the control were stored at room temperature, both in the absence of and in the presence of a 4130 mild steel alloy coupon, and at 120° F. (48.9° C.) in the presence of a 4130 mild steel alloy coupon. Viscosity was determined as above after 15 days and after 32 days. The results are shown in Table 1.

TABLE 1

| | STORAGE TEMPERATURE | STEEL | VISCOSITY (CPS) | | | | % STABILITY | | | |
|---|---|---|---|---|---|---|---|---|---|---|
| | | | 15 DA | 32 DA | 48 DA | 91 DA | 15 DA | 32 DA | 48 DA | 91 DA |
| Control | Room Temp. | No | 1517 | 1493 | 1450 | 1373 | 96 | 95 | 92 | 87 |
| 1.5% DMTD | | | 1587 | 1569 | 1566 | 1524 | 98 | 97 | 97 | 94 |
| Control | Room Temp. | Yes | 1368 | 1070 | 790 | 351 | 87 | 68 | 50 | 22 |
| 1.5% DMTD | | | 1557 | 1538 | 1540 | 1435 | 96 | 95 | 95 | 89 |
| Control | 120° F. | Yes | 816 | 373 | 191 | — | 52 | 24 | 12 | — |
| 1.5% DMTD | | | 1546 | 1366 | 1188 | 950 | 95 | 84 | 73 | 59 |

The data of Table I shows that dimercaptothiadiazole is very effective at stabilizing the viscosity of these fire retardant solutions, even in the presence of the steel coupon, which is highly deleterious to viscosity stability.

EXAMPLE 2

Fire retardant solutions were prepared in a similar manner to those in Example 1, except that varying amounts of dimercaptothiadiazole were used as indicated. The solutions were stored under conditions similar to those of Example 1. Viscosity stability was determined after 30 days, 60 days, 90 days, and, for some samples, after 285 days. The results are shown in Table 2.

TABLE 2

| | Storage Temp. | Steel | % Stability | | | |
| --- | --- | --- | --- | --- | --- | --- |
| | | | 30 Days | 60 Days | 90 Days | 285 Days |
| 0.5% DMTD | Room Temp | No | 102% | 99% | 99% | 57% |
| 1.0% DMTD | Room Temp | No | 101% | 99% | 98% | 68% |
| 1.5% DMTD | Room Temp | No | 100% | 101% | 101% | — |
| 2.0% DMTD | Room Temp | No | 100% | 99% | 100% | 82% |
| 0.5% DMTD | Room Temp | Yes | 96% | 90% | 85% | — |
| 1.0% DMTD | Room Temp | Yes | 98% | 92% | 91% | — |
| 1.5% DMTD | Room Temp | Yes | 97% | 95% | 91% | — |
| 2.0% DMTD | Room Temp | Yes | 100% | 96% | 95% | — |
| 0.5% DMTD | 120° F. | Yes | 77% | 57% | 44% | — |
| 1.0% DMTD | 120° F. | Yes | 78% | 61% | 44% | — |
| 1.5% DMTD | 120° F. | Yes | 83% | 70% | 55% | — |
| 2.0% DMTD | 120° F. | Yes | 79% | 60% | 44% | — |

EXAMPLE 3

A dry fire retardant composition was prepared according to the following formulation:

| | |
| --- | --- |
| Monoammonium orthophosphate | 87% |
| Hydroxypropyl guar | 8% |
| Sodium molybdate | 0.2% |
| Other components and stabilizers | 4.8% |

The "other components and stabilizers" were similar to those in Example 1. A sample was formulated with 0.9% dimercap to thiadiazole (DMTD) and a control was formulated with no DMTD. Both the sample and the control were mixed with water at a rate of 0.96 pounds per gallon of water (0.115 Kg per liter of water). Viscosity was determined as in Example 1. Initial viscosities were 1780 cps and 1479 cps respectively. The solutions were stored as in Example with periodic viscosity measurement. The results are shown in Table 3.

TABLE 3

| | STORAGE TEMPERATURE | STEEL | VISCOSITY (CPS) | | % STABILITY | |
| --- | --- | --- | --- | --- | --- | --- |
| | | | 8 DAYS | 98 DAYS | 8 DAYS | 98 DAYS |
| Control | 74° F. | No | 1370 | 943 | 93 | 64 |
| 0.9% DMTD | 74° F. | No | 1775 | 1663 | 100 | 93 |
| Control | 74° F. | Yes | 1253 | 683 | 85 | 46 |
| 0.9% DMTD | 74° F. | Yes | 1713 | 1424 | 96 | 80 |
| Control | 120° F. | Yes | 424 | — | 28 | — |
| 0.9% DMTD | 120° F. | Yes | 1647 | 620 | 93 | 35 |

The Examples above are illustrative only, and are not intended to limit the scope of this invention. One skilled in the art will recognize many variations that can be made in the Examples, within the spirit, scope, and teaching of this invention.

We claim:

1. A method for stabilizing the viscosity of a galactomannan gum-thickened aqueous composition, comprising incorporating into said aqueous composition a viscosity stabilizing amount of a dimercaptothiadiazole of the formula:

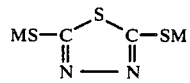

where each M independently is hydrogen or a metal.

2. The method of claim 1 wherein the viscosity stabilizing amount is from 0.01 to 1 part by weight per 100 parts of water.

3. The method of claim 1 wherein said galactomannan gum thickener is guar gum and its derivatives.

4. The method of claim 1 wherein said galactomannan gum-thickened aqueous composition is an aqueous fire retardant composition containing a fire retardant salt selected from the group consisting of ammonium phosphates, ammonium sulfates, phosphate polymers and mixtures thereof.

5. The method of claim 1 further comprising incorporating into said aqueous composition of a viscosity stabilizing amount of a water-soluble molybdenum compound.

6. The method of claim 6 wherein said viscosity stabilizing amount of water-soluble molybdenum compound is from 0.00001 to 1 part by weight per 100 parts of water.

7. A method for stabilizing the viscosity of a galactomannan gum-thickened aqueous fire retardant composition containing a fire retardant salt selected from the group an ammonium phosphate, an ammonium sulfate, or a mixture of an ammonium phosphate and an ammonium sulfate, comprising incorporating into said fire retardant composition from 0.01 to 1 part per 100 parts of water of a dimercaptothiadiazole of the formula

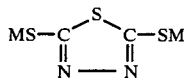

where each M independently is hydrogen or a metal, and incorporating into said fire retardant composition from 0.00001 to 1 part by weight per 250 parts of water of a water-soluble molybdenum compound.

8. An aqueous fire retardant composition, comprising:

a. 1 to 30 parts by weight of a fire retardant salt selected from the group consisting of an ammonium phosphate, an ammonium sulfate, and a mixture thereof;

b. 0.01 to 10 parts by weight of galactomannan gum thickener;

c. a viscosity stabilizing amount of a dimercaptothiadiazole of the formula:

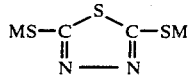

where each M independently is hydrogen or a metal; and d. 100 parts by weight of water.

9. The aqueous fire retardant composition of claim 8 wherein the fire retardant salt is selected from the group consisting of monoammonium orthophosphate, diammonium orthophosphate, diammonium sulfate, and mixtures thereof.

10. The aqueous fire retardant composition of claim 8 wherein said dimercaptothiadiazole is 2,5-dimercapto-1,3,4-thiadiazole.

11. The aqueous fire retardant composition of claim 8 wherein said dimercaptothiadiazole is the disodium salt of 2,5-dimercapto-1,3,4-thiadiazole.

12. The aqueous fire retardant composition of claim 8 wherein said viscosity stabilizing amount is from 0.01 to 1 part by weight of said dimercaptothiadiazole.

13. The aqueous fire retardant composition of claim 8 further comprising from 0.00001 to 2 part by weight of a water-soluble molybdenum compound.

14. The aqueous fire retardant composition of claim 8 further comprising from 0 to 15 parts by weight of other components and stabilizers, selected from the group consisting of corrosion inhibitors, bactericides, defoamers, colorants, flow conditioners, other fire retardants, or a mixture thereof.

15. An aqueous concentrate of a fire retardant composition, comprising:
a. a fire retardant salt selected from the group consisting of monoammonium orthophosphate, diammonium orthophosphate, diammonium sulfate, and mixtures thereof;
b. a galactomannan gum thickener;
c. a dimercaptothiadiazole of the formula:

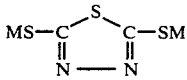

where each M independently is hydrogen or a metal;
d. a water-soluble molybdenum compound; and
e. optionally other components and stabilizers selected from the group consisting of corrosion inhibitors, bactericides, defoamers, colorants, flow conditioners, other fire retardants, and mixtures thereof; and
f. water.

16. A dry fire retardant concentrate, comprising:
a. 1 to 30 parts by weight of a fire retardant salt selected from the group consisting of an ammonium phosphate, an ammonium sulfate, and a mixture thereof;
b. 0.01 to 10 parts by weight of galactomannan gum thickener; and
c. a viscosity stabilizing amount of a dimercaptothiadiazole of the formula:

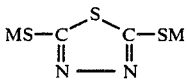

where each M independently is hydrogen or a metal.

17. The dry fire retardant concentrate of claim 16 wherein the fire retardant salt is selected from the group consisting of monoammonium orthophosphate, diammonium phosphate, diammonium sulfate, and mixtures thereof.

18. The dry fire retardant concentrate of claim 16 wherein said dimercaptothiadiazole is 1,5-dimercapto-1,3,4-thiadiazole.

19. The dry fire retardant composition of claim 16 wherein said dimercaptothiadiazole is the disodium salt of 2,5-dimercapto-1,3,4-thiadiazole.

20. The dry fire retardant concentrate of claim 16 wherein said viscosity stabilizing amount is from 0.01 to 1 part by weight of said dimercaptothiadiazole.

21. The dry fire retardant concentrate of claim 16 further comprising from 0.00001 to 1 part by weight of a water-soluble molybdenum compound.

22. The dry fire retardant concentrate of claim 16 further comprising from 0 to 15 parts by weight of other components and stabilizers, selected from the group consisting of corrosion inhibitors, bactericides, defoamers, colorants, flow conditioners, other fire retardants, or a mixture thereof.

23. A dry fire retardant concentrate comprising:
a. 1 to 30 parts by weight of a fire retardant salt selected from the group consisting of monoammonium orthophosphate, diammonium orthophosphate, diammonium sulfate, and mixtures thereof.
b. 0.01 to 10 parts by weight of galactomannan gum thickener;
c. 0.01 to 1 part by weight of a dimercaptothiadiazole of the formula:

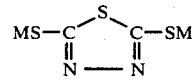

where each M independently is hydrogen or a metal;
d. 0 to 1 part by weight of a water-soluble molybdenum compound; and
e. 0 to 15 parts by weight of other components and stabilizers selected from the group consisting of corrosion inhibitors, bactericides, defoamers, colorants, flow conditioners, other fire retardants, and mixtures thereof.

24. A dry fire retardant concentrate, comprising, on a weight percent basis:
a. 50%-86% Diammonium Sulfate;
b. 10%-40% Monoammonium Orthophosphate;
c. 2.5%-10% Ether Derivatized Galactomannon Gum.
d. 0.00001%-1% Water Soluble Molybdenum Compound;
e. 0.01%-5% Dimercaptothiadiazole of the formula:

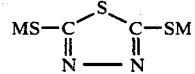

where each M is independently hydrogen or a metal; and
f. 1%-7.5% Other Components and Stabilizers, selected from the group consisting of corrosion inhibitors, bactericides, defoamers, colorants, flow conditioners, other fire retardants, and mixtures thereof.

25. An aqueous fire retardant formed by dissolving the dry fire retardant concentrate of claim 24 in water from about 0.5 pounds to about 2.5 pounds of dry concentrate per gallon of water.

* * * * *

REEXAMINATION CERTIFICATE (4764th)
United States Patent
Kegeler et al.

(10) Number: US 4,606,831 C1
(45) Certificate Issued: Apr. 15, 2003

(54) STABILIZED GALACTOMANNAN GUM COMPOSITIONS

(75) Inventors: Gary H. Kegeler, Rancho Cucamonga, CA (US); Howard L. Vandersall, Upland, CA (US)

(73) Assignee: Astaris LLC, St. Louis, MO (US)

Reexamination Request:
No. 90/006,038, Jun. 20, 2001

Reexamination Certificate for:
Patent No.: 4,606,831
Issued: Aug. 19, 1986
Appl. No.: 06/745,742
Filed: Jun. 17, 1985

(51) Int. Cl.[7] ............... A62D 1/00; C08J 3/05; B01J 13/00
(52) U.S. Cl. ............ 252/7; 252/8.05; 252/601; 536/114; 106/205.6; 106/208.4; 106/205.1; 516/102; 516/107; 516/72; 548/142; 548/105; 548/141
(58) Field of Search ............. 252/7, 8.05, 601; 536/114; 106/205.6, 208.4; 548/142; 516/72, 73, 75, 102, 107

(56) References Cited

U.S. PATENT DOCUMENTS

| | | |
|---|---|---|
| 3,084,057 A | 4/1963 | Jordan |
| 3,951,664 A | 4/1976 | von Konig et al. ........ 252/47.5 |
| 4,024,883 A | 5/1977 | Akgungor et al. ............. 137/5 |
| 4,128,510 A | 12/1978 | Richwine ..................... 528/36 |
| 4,136,043 A | 1/1979 | Davis ......................... 252/47.5 |
| 4,140,643 A | 2/1979 | Davis ......................... 252/47.5 |
| 4,143,007 A | 3/1979 | De Martino .......... 260/17.4 ST |
| 4,257,902 A | 3/1981 | Singer .......................... 252/18 |
| 4,432,847 A | 2/1984 | Fields .................... 204/158 R |
| 4,447,336 A | 5/1984 | Vandersall ..................... 252/7 |
| 4,486,317 A | 12/1984 | Sandell .................... 252/8.5 A |
| 4,603,156 A | 7/1986 | Sortwell ..................... 523/324 |
| 4,686,058 A | 8/1987 | Schwartz et al. ............. 252/75 |

OTHER PUBLICATIONS

*Kirk–Othmer Encyclopedia of Chemical Technology;* 1985.
F. Bottino, et al.—Organic Mass Spectrometry—1982—pp. 335–339.
G. Pala—Ann. Chim. (Rome)—1959—pp. 1464–1471.
G. D. Thorn—Can. J. Chem.—1960—pp. 1439–1444.
N. Petri and O. Glemser—Chem. Ber.—1961—pp. 553–565.
N. Petri and O. Glemser—Chem. Ber.—1961—p. 566.
A. R. Katritzky and J. M. Lagowski—Advances in Heterocyclic Chemistry—1963—pp. 63–81.

*Primary Examiner*—Joseph D. Anthony

(57) ABSTRACT

Galactomannan gum-thickened aqueous compositions are stabilized with a dimercaptothiadiazole.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–25 is confirmed.

\* \* \* \* \*